and

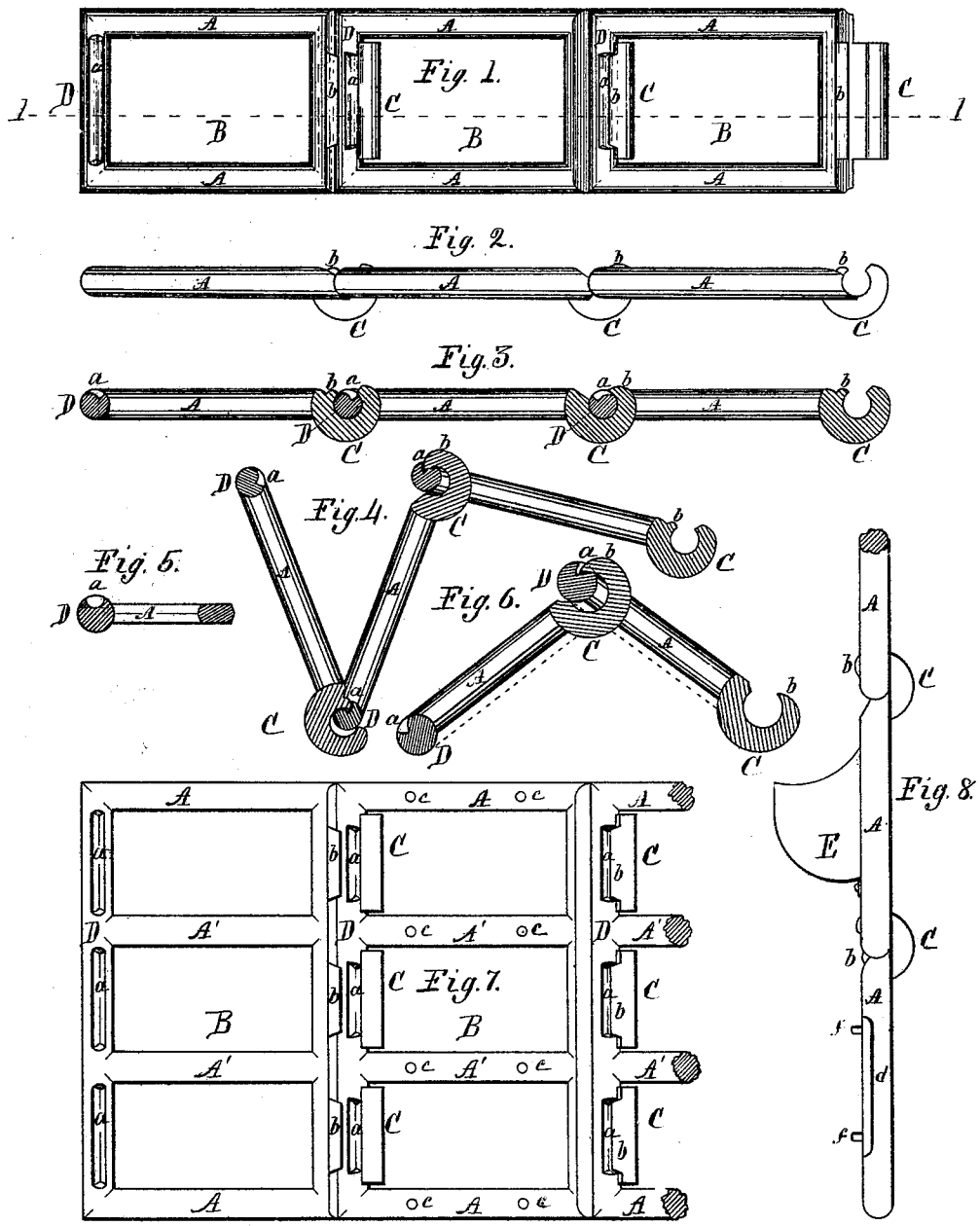

UNITED STATES PATENT OFFICE.

JACOB BEHEL, OF ROCKFORD, ILLINOIS.

IMPROVEMENT IN CHAIN-BELTS.

Specification forming part of Letters Patent No. 181,028, dated August 15, 1876; application filed December 27, 1875.

*To all whom it may concern:*

Be it known that I, JACOB BEHEL, of the city of Rockford, State of Illinois, have invented certain Improvements in Chain-Belts, of which the following is a specification:

My invention relates to that class of chain-belts known as "rag chains," which are used in harvesting and other machines in combianation with what are known as sprocket-wheels, for the purpose of transmitting power from the prime mover, and consists of links of such construction as to admit of being readily put together to form belts of any required length. In case of breakage, a new link may be readily inserted, and, when in place, are not liable to casual detachment. To this end I have devised the chain-belt, consisting of detachable links, which I now proceed to describe.

In the drawings, Figure 1 represents a plan view of my improved chain-belt, of which Fig. 2 is an edge view, and Fig. 3 a sectional view on dotted line 1.

In the above and the remaining figures, which will be hereinafter referred to, similar letters represents similar parts.

The links B are, preferably, of rectangular form, composed of side bars A, which, in this instance are of rounded form, and are connected at one end by a round cross-bar, D, grooved, as at *a*. The other ends of side bars A are connected by a cross-bar, C, the outer end of which is of proper width to enter between the sides bars of the links, and is of circular-hook form, consisting of a portion of a circle greater than a semicircle, either edge of the circular hook forming a lip, *b*, to enter the groove *a* in end bars D when placed at the proper angle, as in Fig. 4, which if then straightened, the end bars D will roll into the hooks C, and the chain will be complete as in Figs. 1, 2, 3, 7, and 8, and cannot unhook unless brought to the same angle as in hooking. For the purpose of compensating for the weakening of the end bars D, in consequence of the grooves *a*, they may be made of larger diameter than the side bars, as represented at D, Fig. 6, which will also increase their wearing-surface and render the belt more durable; or the side bars A may be made as deep as the diameter of the grooved end bar, as seen in in dotted lines, Fig. 6, and reduced in width, making their transverse section of oblong form—deeper than wide. This construction enables me to increase the width of of the hook C, and furnishes a greater bearing in the links in the same sized belts; and the sprockets on the pulleys can also be enlarged, which will increase the durability of both belt and pulley. I do not wish to confine myself to the particular form of groove represented in the preceding figures, so long as they are substantially the same, and are used for the purpose of connecting and disconnecting the links, substantially in the same manner, as it is evident that other forms of the groove may be employed, such as the circular groove, as at *a*, Fig. 5.

Fig. 7 represents a belt, which may be constructed of any reasonable width, and consists of detachable links composed of side bars A, with round end bars D, grooved as at *a*, and hook end bars C, provided with lips *b*, and are connected with one or more central bars, A′. These links are connected and disconnected in substantially the same manner as the single chain-belt above described—the lips *b* on hook-end bars C entering the grooves *a* in round-end bars D, when placed together at the proper angle, and, in being straightened, the end bars D will roll into their hooked bearings, and the hook ends of bars D will enter between the lengthwise bars A A′, &c., of the links. When it is desired to employ the chain-belt for elevators, the links may be provided with holes, as at *c*, for the reception of rivets, screws, or screw-bolts, for the purpose of securing the elevator-buckets to the belt. Or, instead of the holes, studs *f*, as seen in Fig. 8, may be cast on the links.

Fig. 8 represents an edge view of Fig. 7, in which E represents an elevator-bucket in place on the belt. When these belts are designed for light work, and when a belt of single links of greater width is desirable, as in small elevators, or when constructed of great width with intermediate lengthwise bars A′, with a large amount of hook bearing-surface in the links, in such and similar cases the links may be constructed with their lengthwise bars A and intermediate bars A′ of less depth and greater width than the diameter of the end bars D, as seen at Fig. 5. This construction will furnish greater facilities for securing the elevator-buckets or other substances to the links of the chain, the width of the links being such as to admit of being pierced or provided with studs formed thereon, and their wide surfaces furnish an even bearing, and do not require the flanges or ears represented in Figs 7 and 8.

In making these chain-belts of cast material or of cast-iron made malleable, the hook ends of the links are cast on cores, sanded chills, or on chills, to make the hooks of proper form and size to receive the round-end bars D, without bending or fitting the hooks to the proper form after they are cast.

Some of the advantages attending my improvement in chain-belts are as follows: The links as they come from the malleable works or foundry are ready to be put together to form the belt, and do not require bending or fitting or altering; and the manner of putting them together is such as to offer great leverage in forcing the links into position without the aid of tools, and furnish the same leverage in disengaging the links for shortening the belt or in substituting a new link; and the square-ended links furnish the greater amount of bearing-surface on the sprockets of the driving and driven pulley, increasing the durability of both belt and pulleys. They allow belts to be readily put together, lengthened, shortened, or repaired, and furnish the greatest possible bearings on each other. They prevent lateral motion of the belt, and may be constructed of any reasonable width. The central lengthwise bars greatly strengthen the belt.

I am aware that chain-belts have been constructed of rectangular links of various forms—some with round-end bars, connected by an intermediate link of hook form at both ends, which required bending over the round bars of the rectangular links after they were placed in the hooks. Others have been made of links, with one end bar round and one of hook form, to receive the round-end bar of another link, after which the hook end required bending over the round bar. These I do not claim; but

I claim as my invention—

1. A chain-belt link, having one of its end bars grooved, as at $a$, and the other constructed with a coupling-hook, C, having lip $b$, substantially as and for the purpose described.

2. A chain-belt link, grooved, as at $a$, constructed with coupling-hooks C, having lips $b$, and one or more intermediate bars, A′, connecting the end bars, substantially as and for the purpose described.

3. A chain-belt link, constructed with one or more intermediate bars, A′, connecting the end bars D and C, provided with grooves and lips, the hook portion of bar C entering between the intermediate and outside bars A′ and A, substantially as and for the purposes described.

4. A removable link of rectangular form for chain-belts, having the longitudinal bars A A′, flattened on their faces and provided with holes $c$ or studs $f$, substantially as and for the purposes described.

JACOB BEHEL.

Witnesses:
GRANVILLE HERRING,
JOHN M. BUELL.